US008133929B2

(12) United States Patent
Hoefflin et al.

(10) Patent No.: US 8,133,929 B2
(45) Date of Patent: Mar. 13, 2012

(54) METHOD FOR INCORPORATING LONG GLASS FIBERS INTO EPOXY-BASED REINFORCING RESINS

(75) Inventors: Frank Hoefflin, Royal Oak, MI (US); Patricia Heidtman, Livonia, MI (US); Eric R. Medaris, Berkley, MI (US)

(73) Assignee: Sika Technology AG, Baar (CH)

( * ) Notice: Subject to any disclaimer, the term of this patent is extended or adjusted under 35 U.S.C. 154(b) by 362 days.

(21) Appl. No.: 12/103,206

(22) Filed: Apr. 15, 2008

(65) Prior Publication Data
US 2009/0258217 A1 Oct. 15, 2009

(51) Int. Cl.
C08J 9/04 (2006.01)
C08J 9/16 (2006.01)
C08L 63/00 (2006.01)
B32B 17/04 (2006.01)
B32B 27/04 (2006.01)
B32B 27/38 (2006.01)

(52) U.S. Cl. ........ 521/135; 428/361; 428/378; 521/134; 521/178

(58) Field of Classification Search ............ 523/440, 523/443, 444; 428/297.4, 323, 325, 332, 428/361, 375, 378; 521/134, 135, 178
See application file for complete search history.

(56) References Cited

U.S. PATENT DOCUMENTS

| | | | |
|---|---|---|---|
| 5,185,117 A | 2/1993 | Hawley | |
| 6,131,897 A | 10/2000 | Barz et al. | |
| 6,186,769 B1 | 2/2001 | Hawley | |
| 6,263,635 B1 | 7/2001 | Czaplicki | |
| 6,296,298 B1 | 10/2001 | Barz | |
| 6,311,452 B1 | 11/2001 | Barz et al. | |
| 6,358,584 B1 | 3/2002 | Czaplicki | |
| 6,368,438 B1 | 4/2002 | Chang et al. | |
| 6,387,470 B1 | 5/2002 | Chang et al. | |
| 6,419,305 B1 | 7/2002 | Larsen | |
| 6,467,834 B1 | 10/2002 | Barz et al. | |
| 6,471,285 B1 | 10/2002 | Czaplicki et al. | |
| 6,474,723 B2 | 11/2002 | Czaplicki et al. | |
| 6,561,571 B1 | 5/2003 | Brennecke | |
| 6,668,457 B1 | 12/2003 | Czaplicki | |
| 6,729,425 B2 | 5/2004 | Schneider et al. | |
| 6,777,049 B2 | 8/2004 | Sheldon et al. | |
| 6,786,533 B2 | 9/2004 | Bock et al. | |
| 6,793,274 B2 | 9/2004 | Riley et al. | |
| 6,880,657 B2 | 4/2005 | Schneider et al. | |
| 6,883,858 B2 | 4/2005 | Barz | |
| 6,890,021 B2 | 5/2005 | Bock et al. | |
| 6,905,745 B2 | 6/2005 | Sheldon et al. | |
| 6,920,693 B2 | 7/2005 | Hankins et al. | |
| 6,932,421 B2 | 8/2005 | Barz | |
| 6,941,719 B2 | 9/2005 | Busseuil et al. | |
| 6,953,219 B2 | 10/2005 | Lutz et al. | |
| 7,025,409 B2 | 4/2006 | Riley et al. | |
| 7,077,460 B2 | 7/2006 | Czaplicki et al. | |
| 7,105,112 B2 | 9/2006 | Czaplicki et al. | |
| 7,111,899 B2 | 9/2006 | Gray | |
| 7,114,763 B2 | 10/2006 | Riley et al. | |
| 7,144,071 B2 | 12/2006 | Le Gall et al. | |
| D538,983 S | 3/2007 | Green et al. | |
| 7,194,804 B2 | 3/2007 | Czaplicki | |
| 7,255,388 B2 | 8/2007 | Le Gall et al. | |
| 7,296,847 B2 | 11/2007 | Czaplicki et al. | |
| 7,313,865 B2 | 1/2008 | Czaplicki et al. | |
| 7,374,219 B2 | 5/2008 | Brennecke | |
| 7,478,478 B2 | 1/2009 | Lutz et al. | |
| 7,479,246 B2 | 1/2009 | Muteau et al. | |
| 7,494,179 B2 | 2/2009 | Deachin et al. | |
| 7,503,620 B2 | 3/2009 | Brennecke et al. | |
| 2001/0017018 A1 | 8/2001 | Czaplicki | |
| 2002/0160130 A1 | 10/2002 | Sheldon et al. | |
| 2002/0174954 A1 | 11/2002 | Busseuil et al. | |
| 2003/0042056 A1 | 3/2003 | Schneider et al. | |
| 2003/0057737 A1 | 3/2003 | Bock et al. | |
| 2003/0090129 A1 | 5/2003 | Riley et al. | |
| 2003/0184121 A1 | 10/2003 | Czaplicki et al. | |
| 2003/0218019 A1 | 11/2003 | Le Gall et al. | |
| 2004/0046421 A1 | 3/2004 | Barz | |
| 2004/0084141 A1 | 5/2004 | Czaplicki | |
| 2004/0143969 A1 | 7/2004 | Czaplicki et al. | |
| 2004/0159481 A1 | 8/2004 | Schneider et al. | |
| 2004/0164588 A1 | 8/2004 | Lutz et al. | |
| 2004/0207233 A1 | 10/2004 | Bock et al. | |
| 2004/0212220 A1 | 10/2004 | Riley et al. | |
| 2004/0224108 A1 | 11/2004 | Sheldon et al. | |
| 2004/0227377 A1 | 11/2004 | Gray | |
| 2004/0256888 A1 | 12/2004 | Le Gall et al. | |
| 2004/0266899 A1* | 12/2004 | Muenz et al. | 521/135 |
| 2005/0017543 A1 | 1/2005 | Riley et al. | |
| 2005/0040671 A1 | 2/2005 | Barz | |
| 2005/0212332 A1 | 9/2005 | Sheldon et al. | |
| 2005/0276970 A1 | 12/2005 | Busseuil et al. | |
| 2006/0006695 A1 | 1/2006 | Lutz et al. | |
| 2006/0008615 A1 | 1/2006 | Muteau et al. | |
| 2006/0061115 A1 | 3/2006 | Brennecke | |
| 2006/0267378 A1 | 11/2006 | Czaplicki et al. | |

(Continued)

FOREIGN PATENT DOCUMENTS

CA 836628 A * 3/1970

(Continued)

OTHER PUBLICATIONS

International Search Report dated Jul. 16, 2009.
"Industrial Plastics Theory and Applications" 4th Edition; Erik Lokensgard, pp. 232-233, 2004.
"Pushtrusion Direct In-Line Compounding", PlastiComp Internet Brochure, http://www.plasticomp.com/ intro_pushtrusion.html (1 page), 2008.

Primary Examiner — Michael J Feely
(74) Attorney, Agent, or Firm — Rader, Fishman & Grauer PLLC

(57) ABSTRACT

A structural reinforcing material and method of making the same is disclosed and described. The material is prepared by coating glass reinforcing fibers with a molten epoxy-based composition. The glass fiber reinforced material can then be formed into a preform suitable for injection molding into an expandable sealing baffle.

11 Claims, 5 Drawing Sheets

U.S. PATENT DOCUMENTS

| | | |
|---|---|---|
| 2007/0045866 A1 | 3/2007 | Gray et al. |
| 2007/0075569 A1 | 4/2007 | Barz et al. |
| 2007/0080559 A1 | 4/2007 | Stolarski et al. |
| 2007/0090666 A1 | 4/2007 | Brennecke et al. |
| 2007/0281523 A1 | 12/2007 | Riley |
| 2008/0023987 A1 | 1/2008 | Schneider et al. |
| 2008/0143143 A1 | 6/2008 | Brennecke |
| 2008/0202674 A1 | 8/2008 | Schneider et al. |
| 2008/0257491 A1 | 10/2008 | Czaplicki et al. |
| 2009/0085379 A1 | 4/2009 | Takahashi et al. |
| 2009/0108626 A1 | 4/2009 | Richardson et al. |

FOREIGN PATENT DOCUMENTS

| | | |
|---|---|---|
| WO | WO-01/12702 A1 | 2/2001 |
| WO | WO-02/088044 A1 | 11/2002 |
| WO | WO-03/042315 A1 | 5/2003 |
| WO | WO-2004/009681 A2 | 1/2004 |
| WO | WO-2006/052421 A2 | 5/2006 |
| WO | WO-2007/082677 | 7/2007 |
| WO | WO 2007143646 A2 * | 12/2007 |
| WO | WO-2008/073503 A1 | 6/2008 |
| WO | WO-2008/110347 | 9/2008 |
| WO | WO-2009/049886 | 4/2009 |

* cited by examiner

METHOD FOR INCORPORATING LONG GLASS FIBERS INTO EPOXY-BASED REINFORCING RESINS

FIELD

The present disclosure relates generally to structural reinforcing compositions that are suitable for forming expandable sealant and baffle members, and more specifically, to structural reinforcing compositions that include glass fiber reinforcers and methods of making the same.

BACKGROUND

During the fabrication of automobiles, trucks, and similar over-the-road vehicles, many body components present structural members having cavities that require sealing to prevent the entrance of moisture and contaminants which can cause corrosion of the body parts. It is also desirable to greatly strengthen the members while maintaining their light weight. It is also beneficial to stabilize these members in order to attenuate noise that would otherwise be transmitted along the length or passage of the cavity. Many of these cavities are irregular in shape or narrow in size, thus making them difficult to properly seal and structurally reinforce.

Many attempts have been made to seal these cavities. Certain polymeric expandable sealing compositions have been proposed. However, many polymeric materials suffer from insufficient compressive strength. Certain reinforcing materials, such as glass fillers, have been proposed to provide additional strength. However, known processes of incorporating such high aspect ratio fillers into expandable sealing compositions typically degrade the reinforcer and its reinforcing properties. For example, in certain processes, glass fibers are combined, mixed, and heated with the solid polymeric resins. One drawback of such processes is that the glass fibers tend to break, resulting in shorter fiber lengths, less fiber entanglement, and poorer reinforcing performance. Thus, a need has arisen for a structural reinforcing composition and method of making the same which addresses the foregoing issues.

DETAILED DESCRIPTION

Figure 1:
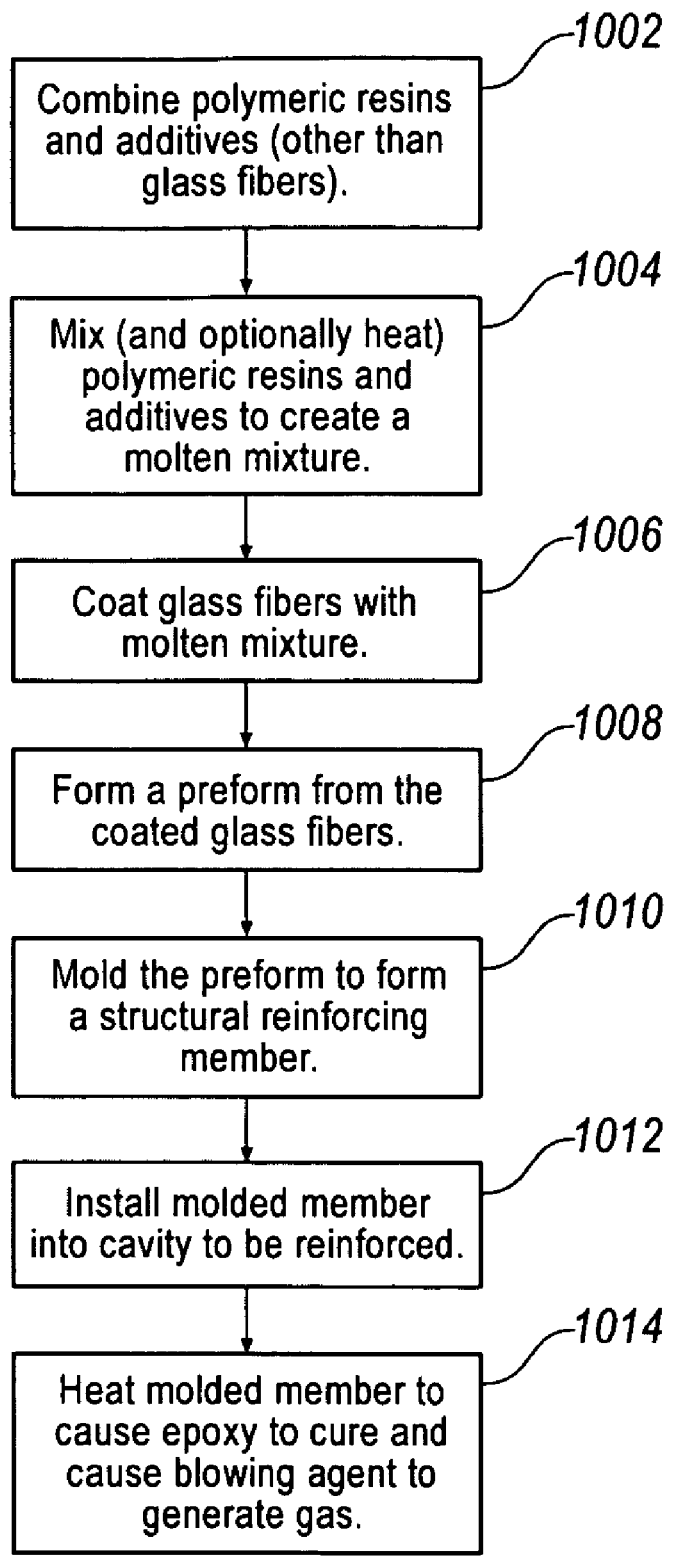
FIG. 1 depicts a method of making a structural reinforcing member.

Structural reinforcing compositions of the type described herein generally comprise one or more polymeric components and a glass fiber reinforcer. In order to maintain a desired length of glass fiber in the composition, processes are described wherein the polymeric components are provided in molten form and then coated on the glass fibers.

The structural reinforcing compositions are preferably epoxy-based, i.e., they comprise epoxy resins having one or more polymeric or low molecular weight compounds with epoxy groups that can react to form a cross-linked network. In certain embodiments, the compositions comprise a mixture of one or more thermoplastic polymeric resins and an epoxy resin. As used herein, the term "thermoplastic" refers to a material that can be repeatedly softened by heat and hardened by cooling. The structural reinforcing compositions are preferably injection moldable, expandable, and light weight such that they can be formed into a structural reinforcing member.

Suitable epoxy resins include both liquid epoxy resins (i.e., epoxy resins that are liquid at or above room temperature, which is about 20° C.) and solid epoxy resins (i.e., epoxy resins that are solid at or above room temperature). Suitable solid epoxy resins include without limitation Araldite® GT 9654 (supplied by Huntsman International LLC of Salt Lake City, Utah), Araldite® ECN 9699, Epon 1001F (supplied by Hexion Specialty Chemicals of Houston, Tex.), Elvaloy® PTW, which is supplied by DuPont, and D.E.R. 661 (a product of the Dow Chemical Co. of Midland, Mich.). In certain preferred compositions, the solid epoxy component or components have a softening point of at least about 60° C. In more preferred compositions, the softening point is from about 70° C. to about 100° C.

Elvaloy® PTW is an ethylene copolymer containing glycidyl methacrylate, which provides epoxy functionality. It has a softening point (melt point) of about 72° C. Araldite® GT 9654 is an unmodified Bisphenol A Type 2 Epoxy Resin with a softening point ranging from about 75° C. to about 85° C. Araldite® ECN 9699 is a multifunctional epoxy novolac resin with a softening point of from about 80° C. to about 100° C. DER 661 is a low molecular weight solid reaction product of epichlorhydrin and Bisphenol-A with a softening point of from about 75° C. to about 85° C. EPON 1001F is a low molecular weight solid epoxy resin derived from a liquid epoxy resin and Bisphenol-A with a softening point of from about 75° C. to about 80° C.

The epoxy resin may comprise one or more liquid epoxy resins, such as bisphenol A-based liquid epoxy resins. Suitable liquid epoxy resins include without limitation Araldite 6010® (a bisphenol A type epoxy resin) and Epon 71. Araldite® 6010 is an unmodified liquid epoxy resin based on bisphenol A and epichlorohydrin with an epoxy value of from about 0.5208 to about 0.5495 eq./100 g (ASTM D-1652) and a weight per epoxide of about 182 to about 192 g/eq.

The epoxy resin component or components are generally present at a level of from about 25% to about 70% by weight of the total structural reinforcing composition (i.e., including reinforcers and additives). If solid epoxy components are used, they are preferably provided in an amount ranging from about 45% to about 65% by weight of the total structural reinforcing composition. If liquid epoxy components are used, they are preferably provided in an amount ranging from about 30% to about 50% by weight, with an amount ranging from about 35% to about 45% being preferred. If solid and liquid epoxy resins are used, an optional compatibilizer may also be included. In one exemplary embodiment, the compatibilizer comprises a rubber, such as nitrile butadiene rubber, which may also act as an impact modifier. The compatibilizer may be present in an amount ranging from about 0 to about 5% by weight of the total structural reinforcing composition.

As mentioned previously, the structural reinforcing compositions described herein may also include a thermoplastic polymeric resin. Suitable thermoplastics include all thermoplastic polymers with a glass transition temperature of greater than 90° C. such as polycarbonates, polystyrenes, uncrosslinked rubbers (preferably solid rubbers), and mixtures thereof. Preferred solid rubbers include styrene-butadiene rubber (such as SBR 1009®), nitrile-butadiene rubber (such as Nipol 1411®), thermoplastic elastomers including SBS block co-polymers (such as Fina Clear 530®.), and mixtures thereof. As used herein, "rubber" is intended to include all synthetic rubbers as well as elastomers. If a thermoplastic resin is included, it is preferably provided in an amount ranging from about 2% to about 20% by weight of the total structural reinforcing composition, with amounts ranging from about 5% to about 15% being preferred. An amount ranging from about 8% to about 10% is especially preferred.

If the rubber used is an SBS block co-polymer, it is preferred that the SBS block co-polymer have a molecular weight of from about 100,000-150,000, and preferably from about 110,000-135,000. When a styrene-butadiene rubber is used as the rubber, the ratio of butadiene to styrene is preferably from about 32:68 to about 18:82, and more preferably from about 27:73 to about 23:77. If the thermoplastic resin is a polystyrene, it preferably has a molecular weight of from about 150,000-320,000, and more preferably from about 200,000-270,000. Two preferred polystyrenes are sold under the trade names Fina Crystal 500® and Fina Crystal 535.

In one illustrative embodiment, the expandable structural reinforcing compositions further include a second thermoplastic resin different from the first thermoplastic resin. The second thermoplastic resin is likewise preferably selected from the group consisting of the polystyrenes, uncrosslinked rubbers (preferably solid rubbers or thermoplastic elastomers), and mixtures thereof.

In another embodiment, the compositions of the invention further include a third thermoplastic resin in addition to and different from the first and second thermoplastic resins. The third thermoplastic resin is preferably selected from the group consisting of polystyrenes, uncrosslinked rubbers, and mixtures thereof. A preferred third thermoplastic resin is a solid rubber such as nitrile-butadiene rubber (NBR). When NBR is used, the ratio of acrylonitrile to butadiene is preferably from about 42:58 to about 35:65, and more preferably about 38:62.

The structural reinforcing compositions described herein also include a glass fiber reinforcer and may include other additives such as pigments, blowing agents, fillers, catalysts, curing agents, and mixtures thereof. Additional reinforcers such as glass microspheres, and hydrated amorphous silica may also be used. Suitable pigments include carbon black and zinc oxide and are present in a range of 0 to about 5% by weight of the total structural reinforcing composition.

The structural reinforcing compositions described herein preferably include a blowing agent that creates voids or cells in the composition upon heating to cause it to expand. Suitable blowing agents include chemical or physical blowing agents that release gases to form cells or voids in the structural reinforcing composition once a particular temperature range is reached. Preferred chemical blowing agents include azodicarbonamides, such as Celogen® AZ 765, Celogen® AZ 754A, and Celogen® AZ 130, which are supplied by Uniroyal, and Unicel DL75N, which is supplied by Dong Jin Chemical. The blowing agent is present in an amount ranging from about 0 to about 5% by weight of the total structural reinforcing composition. The blowing agent is preferably selected so that it will not cause the structural reinforcing composition to expand until it has been molded into a structural reinforcing member and installed in an object (e.g., a vehicle) which is to be sealed and reinforced. In certain embodiments, the selected blowing agent will not release significant amounts of void-forming gases until a temperature of at least about 130° C. is reached. In preferred embodiments, the selected blowing agent will not release significant amounts of void-forming gases until a temperature of at least about 150° C. is reached.

Suitable catalysts include urea-based catalysts such as N,N dimethyl phenyl urea and catalysts sold under the trade names MBTS®, Dicup®, and Urisys® U 405 and are present in an amount from 0 to about 5% by weight of the total structural reinforcing composition. Suitable curing agents include sulfur and amine-based curing agents, including without limitation dicyandiamides (e.g., Urisys® DDA 10). In general, such amine-based curing agents may be used to create higher or lower cross-link densities, thereby increasing or decreasing the glass transition temperature of the reinforcing composition, respectively.

The addition of the curing agent makes the structural reinforcing composition heat reactive in that curing will occur upon the addition of sufficient heat. The epoxy curing agent is preferably selected to insure that the epoxy component(s) cure at a temperature higher than the temperature at which the molten polymeric components of the structural reinforcing composition are coated on the glass fiber components. In certain embodiments, epoxy curing agents are selected which cure at temperatures no lower than about 110° C., and preferably no lower than about 120° C. Especially preferred epoxy curing agents will cure the epoxy component(s) at temperatures no lower than from about 130° C. to about 140° C.

Preferred glass fiber reinforcers include epoxy compatible E-glass or S-glass fibers. The glass fibers are generally present in an amount that ranges from about 3% to about 40% by weight of the total structural reinforcing composition. In certain illustrative examples, the total percentage by weight of glass fibers in the structural reinforcing composition preferably ranges from about 10% to about 30% by weight, and more preferably ranges from about 15% to about 25% by weight. If discrete strands of glass fibers are used, they preferably have an aspect ratio (length/diameter) of at least 100. Aspect ratios ranging from 150 to 800 are especially preferred. One suitable E-glass fiber is Star Stran® 706C, which is supplied by Johns Manville. Star Stran® 706C has a filament diameter of 16 μm and is available in lengths of 3 mm, 6 mm, 12 mm, which translates to aspect ratios of 187.5, 375, and 750. If continuous strands of glass fibers are coated with the molten polymeric material, the coated fibers are preferably cut into preforms (as discussed below) having a length that yields an effective glass fiber aspect ratio of from about 150 to 800.

The compositions described herein are useful for providing structural reinforcing members. FIG. 1 illustrates a method of making a structural reinforcing member, such as an expandable sealing baffle, from the structural reinforcing compositions described herein. In step 1002, the polymeric resins (e.g., epoxy resins and thermoplastic resins) are combined with additives (e.g., curing agents, blowing agents, catalysts, fillers, reinforcers). In step 1004, the combined ingredients are mixed to form a molten composition. The mixing action will generate heat necessary to melt the ingredients. However, if additional heat is required, it may be provided by an external heat source. In step 1006, glass fibers are provided and are coated with the molten composition. As will be discussed further below, in certain preferred processes, the glass fibers are provided as continuous strands that are coated with the molten composition which is subsequently cut to a desired length.

The coated fibers are then used to create a "preform" (step 1008), such as by passing the coated glass fibers through a die. Once the preform is cooled, it is then supplied to a molding machine where it is molded into the desired shape to form a structural reinforcing member (step 1010). The molded member is then installed in a vehicle cavity or other area in which sealing and/or reinforcing is required (step 1012). After installation, the molded member is heated to a temperature that is sufficient to cause cross linking of the epoxy components and to cause the blowing agent to generate gases (step 1014). The generated gas causes the member to expand and seal into place. Specific apparatuses and processes for performing the steps of FIG. 1 will now be described.

Figure 2:
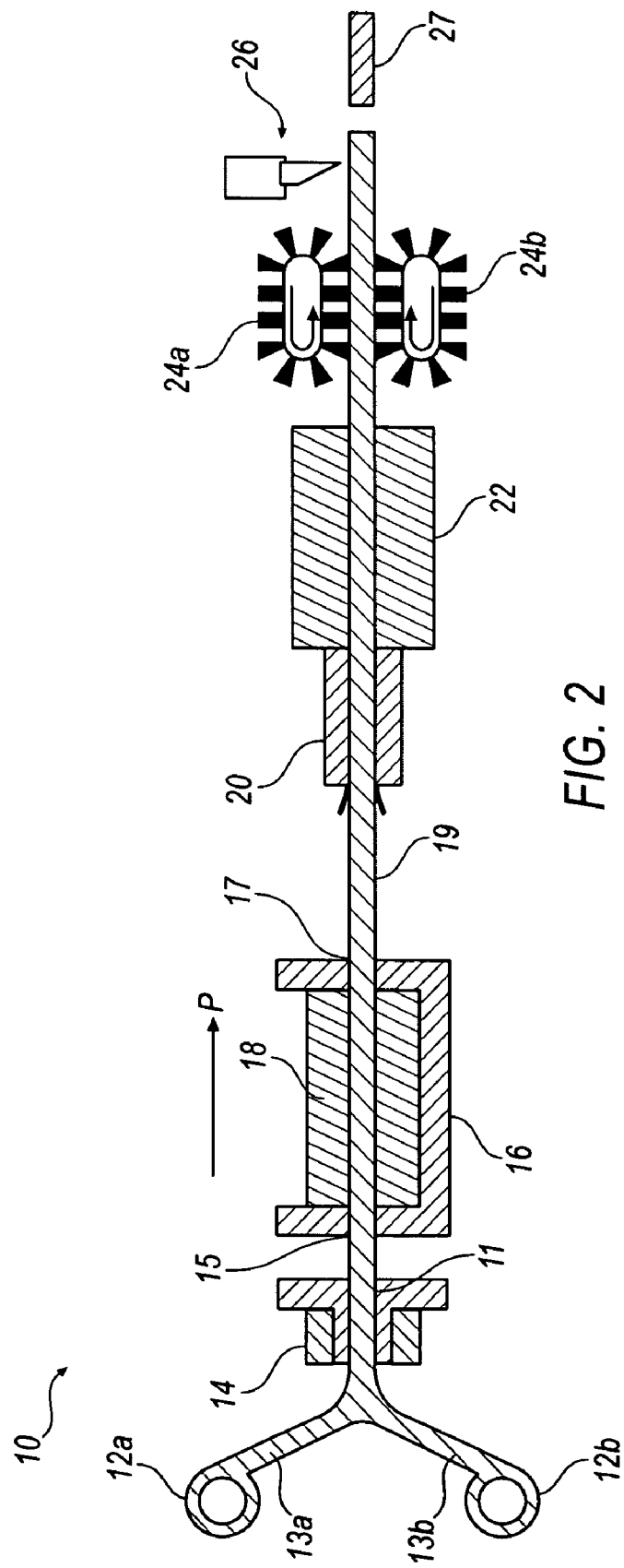
FIG. 2 depicts an apparatus used to coat glass fibers with an epoxy-based structural reinforcing composition.

Referring to FIG. 2, an apparatus 10 for making a preform is provided. More specifically, apparatus 10 is configured to coat glass fibers with a molten polymeric composition that is formed into a desired cross-sectional shape and then sized to the desired length. Apparatus 10 may be configured to provide a preform of desired composition and shape which can then be supplied to an injection molding process to form a reinforcing structural member. Alternatively, apparatus 10 may be directly connected to an injection molding or any other forming device.

The apparatus of FIG. 1 is configured to pull continuous strands of glass fibers (rovings) through a molten mixture 18 of polymeric resins and additives. The coated fibers are then formed into a preform 27 of desired shape. Because the fibers are pulled through the molten material, the process is sometimes referred to as "Pultrusion." Pultrusion apparatus 10 comprises glass fiber rolls 12a and 12b which feed continuous strands of glass fiber 13a and 13b to the process. Guide 14 aids in maintaining the alignment of the glass fiber strands 13a and 13b (which may comprise more than two strands), to facilitate their movement to resin impregnator 16.

Resin impregnator 16 contains molten mixture 18 of polymeric resins in which optional additives (e.g., curing agents, blowing agents, fillers, pigments, catalysts, reinforcers) are mixed. Glass strands 13a and 13b pass through resin impregnator 16 and become coated with molten mixture 18 as they move in processing direction P. Resin impregnator 16 is generally an open tank of any desired shape with one or more inlets 15 which are aligned with corresponding outlets 17 to facilitate the movement of glass strands 13a and 13b therethrough. Resin impregnator 16 may include an internal mixing apparatus (e.g., a screw or mixing blades) and a heater to create a molten mixture of the polymeric components and additives. Alternatively, a separate mixing and/or heating apparatus may be provided in which the polymeric components and additives are combined to yield a molten mixture that is then discharged into impregnator 16. The thermoplastic resins, epoxy resins, and additives (other than glass fibers 13a and 13b) are mixed and/or heated until a substantially homogeneous molten mixture 18 is obtained. The amount of shear and/or heat supplied by the mixing apparatus is preferably sufficient to provide a molten, substantially homogeneous mixture without causing any curing to occur. In one embodiment, the temperature of molten mixture 18 is from about 75° C. to about 95° C.

Guide 14 has one or more throughbores 11 which are preferably sized to accommodate glass fibers 13a and 13b and aligned with corresponding inlets 15 in resin impregnator 16. Forming die 22 may include a heating source (not separately shown) and includes one or more internal passages that are shaped to provide the desired cross-section of coated glass fibers. Forming die 22 may be heated to maintain the polymeric coating on glass fibers 13a and 13b in a sufficiently molten state to ensure even coating. However, it is preferably maintained at a temperature below that at which the epoxy components of the polymeric material will cure. In one embodiment, the internal passages of die 22 are in the shape of pellets. In an illustrative example, die 22 is sized to form pellets having a diameter ranging from about 1 mm to 6 mm, with a diameter range of from about 2.8 mm to about 5 mm being preferred. Preformer 20 comprises one or more internal passages through which coated fibers 19 pass. The internal passages are preferably shaped and sized in accordance with the desired shape of the perform (e.g, pellets) that will be formed for use in subsequent processing (e.g., injection molding).

After passing through forming die 22, the coated glass fibers pass through pull blocks 24. In the embodiment of FIG. 1, pull blocks 24a and 24b comprise a caterpillar type pull, however pull blocks 24 may have a variety of other shapes and structures. Each pull block 24a and 24b includes rotating tracks that engage the coated glass fibers. Pull blocks 24a and 24b rotate in substantially opposite directions to one another (i.e., pull block 24a rotates in a counterclockwise direction, and pull block 24b rotates in a clockwise direction). As the tracks rotate, the glass fibers are moved in processing direction P. Because pull blocks 24a and 24b are located downstream of resin impregnator 16, they pull glass fibers 13a and 13b through resin impregnator 16.

Cut-off saw 26 periodically engages the coated glass fibers exiting pull blocks 24a and 24b to cut the coated glass fibers to a desired length. The frequency at which cut-off saw 26 engages the coated glass fibers dictates the ultimate length of the pultruded product. In one embodiment, pellets 27 of at least 3 mm in length are provided. In other embodiments, pellet lengths of 6 mm, 8 mm or 12 mm are provided. As FIG. 2 indicates, in the pultrusion process, the length of glass fibers contained in the pultruded product (e.g., pellets) is substantially equal to the length of the pultruded product. Also, because the orientation of glass fibers 13a and 13b remains substantially constant throughout the pultrusion process, pellets 27 will have glass fibers with substantially only one orientation, i.e., the glass fibers are substantially isotropic. After exiting die 22, pellets 27 are preferably cooled to below the softening point of molten mixture 18 to yield a substantially solid pellet.

In accordance with another embodiment of the method, the molten composition 18 through which glass fibers 13a and 13b are pulled is created by first combining, mixing (and optionally, heating) thermoplastic and epoxy resins until a temperature of from about 75° C. to about 100° C. is reached. If multiple thermoplastic resins are used, the first thermoplastic resin may be combined with a small portion of the epoxy resin (e.g., $\frac{1}{40}^{th}$ of the total amount) until the desired temperature is reached. Any additional thermoplastic resins may then be added, after which the remaining amount of epoxy resin(s) is added. The thermoplastic and epoxy resins are preferably mixed until a substantially homogeneous mixture is obtained. Any desired reinforcers (other than glass fibers 13a and 13b) are then added, after which any desired pigments are added. The temperature of the mixing apparatus is then reduced to below about 70° C., after which the desired blowing agents, curing agents, and/or catalysts are added and mixing is resumed.

As mentioned above, resin impregnator 16 may be provided with a suitable mixing and heating apparatus or one may be separately provided which discharges molten material 18 into impregnator 16. If sequential addition and mixing of ingredients is desired as described above, an extruder with multiple feed ports may be used to provide the desired sequence and timing of ingredient addition and mixing.

Pull blocks 24a and 24b are preferably set at a speed which provides the desired speed of glass fiber travel through die 22. In one exemplary embodiment, the speed of fiber travel ranges from about 5 to about 30 feet/minute. As the coated glass fibers exit die 22, they cool to form solid pellets 27. Solid pellets 27 comprise a glass fiber reinforced, epoxy-based resin (or a combination of epoxy-based resins, and optionally, thermoplastic resin(s)) which can be injection molded to form a structural reinforcing member.

Figure 3:
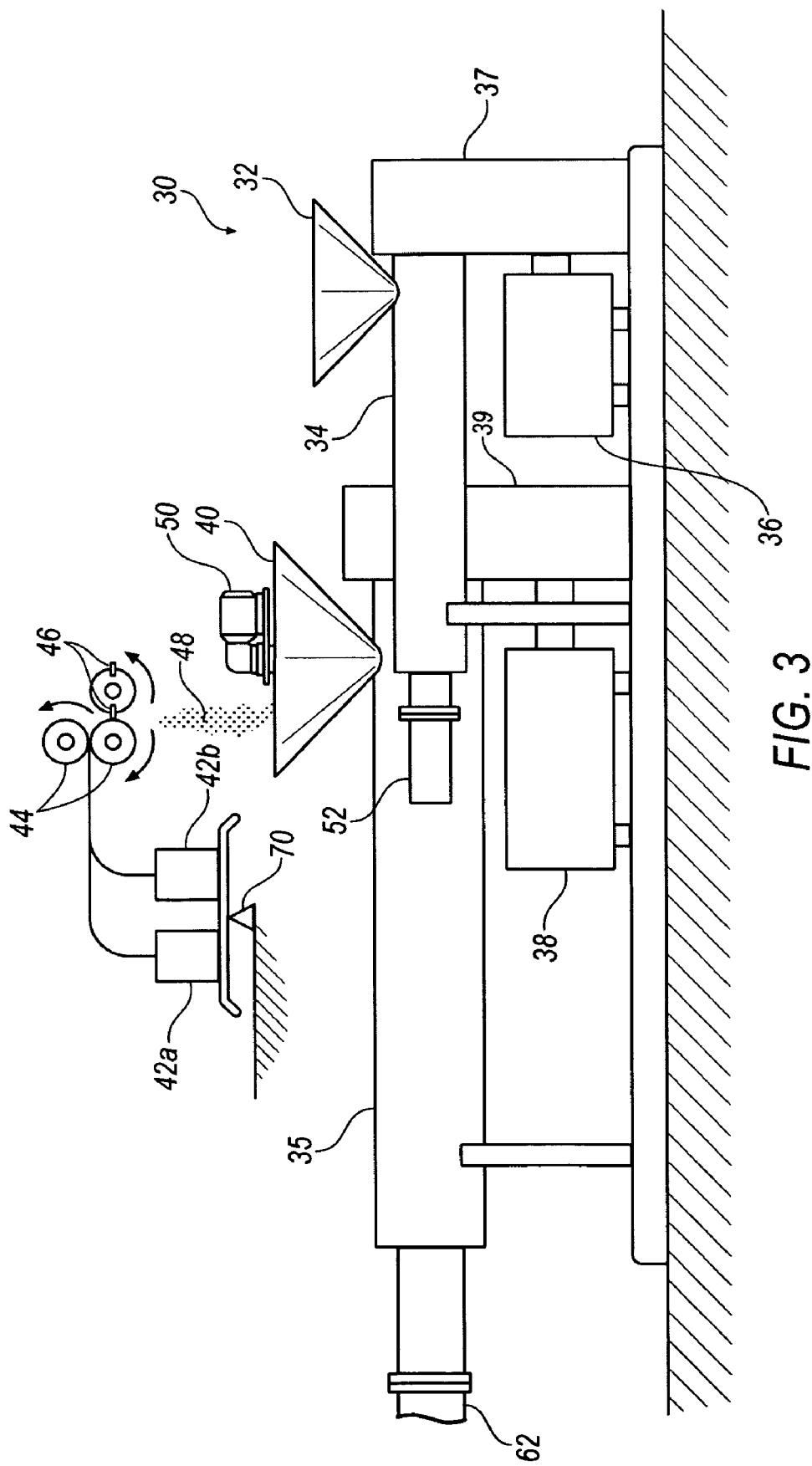
FIG. 3 depicts a side elevation view of an alternative apparatus used to coat glass fibers with an epoxy-based structural reinforcing composition.
Figure 4:
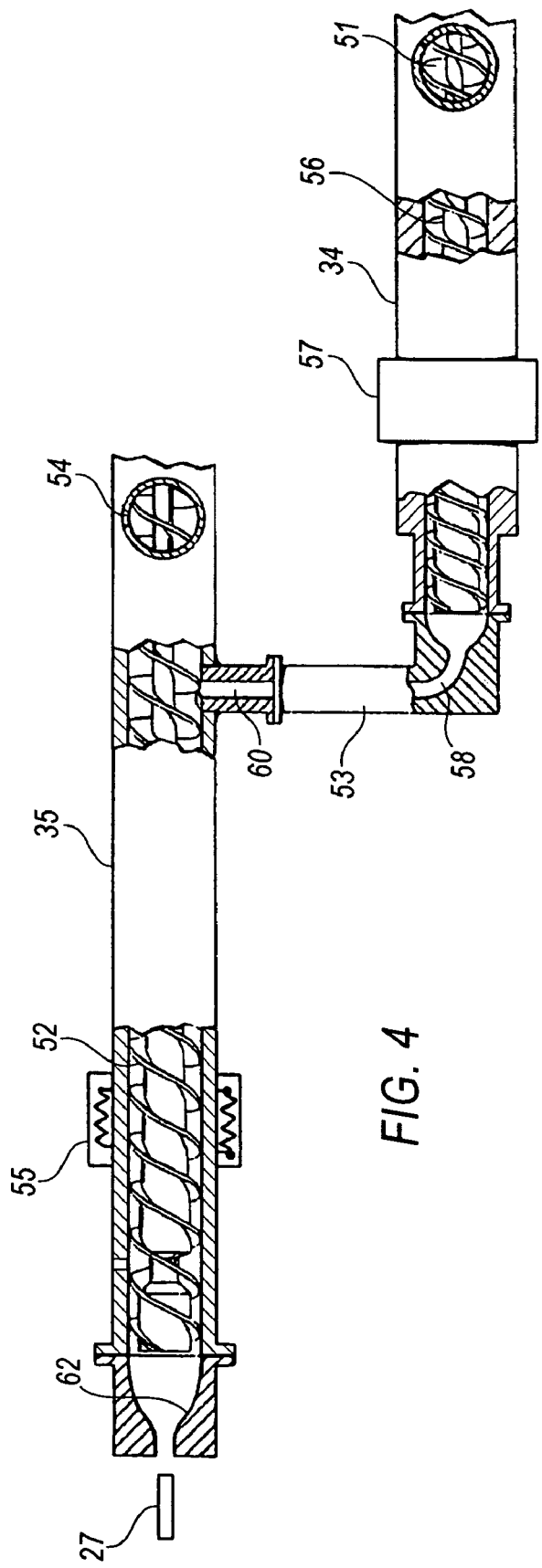
FIG. 4 depicts a fragmentary, top plan view, partially in section, of a portion of the apparatus of FIG. 3.

Referring to FIGS. 3 and 4, an alternative apparatus 30 suitable for providing glass-reinforced, structural reinforcing member preforms is described. Unlike the embodiment of FIG. 2, apparatus 30 coats glass fibers of predetermined lengths with an epoxy-based resin. In addition, the fibers are forced or injected into a molten mixture of polymeric materials and additives instead of being pulled through it. Apparatus 30 includes resin extruder 34 and compounding extruder 35. Resin extruder 34 mixes the polymeric ingredients and additives (other than glass fiber reinforcers) and supplies a molten mixture of the same to compounding extruder 35. Glass fibers are then combined with the molten mixture in compounding extruder 35. Feed hopper 32 is provided for combining the polymeric resins, curing agents, blowing agents, pigments, catalysts, and reinforcers. The combined ingredients are fed to resin extruder 34 via resin inlet 51 (FIG. 4). Rotating screw 56 (FIG. 4) mixes the ingredients together and causes them to travel to transition region 58. The shearing action of rotating screw 56 supplies frictional heating to the resins causing them to become molten. If necessary, supplemental heater 57 may also be used to provide additional heat necessary to melt the polymeric resins. The action of rotating screw 56 directs the polymeric ingredients and additives toward compounding extruder 35, which they enter via inlet port 60. Adapter conduit 53 connects transition region 58 of resin extruder 34 and the inlet port 60 of compounding extruder 35. Motor 36 drives a power transmitting device 37 (e.g., a belt drive) which is connected to screw 56, thereby causing it to rotate.

Rolls 42a and 42b (more than two (2) rolls may be used) of glass fiber rovings are fed to friction rollers 44 which pull the fibers off of rolls 42a and 42b. Cut-off roller 46 is provided with a plurality of blades that are configured to cut the rovings into fibers of predetermined length 48. The cut rovings 48 then fall into glass fiber hopper 40 and are fed to compounding extruder 35 by a feed auger 33 (not shown) that is driven by motor 50. Feed auger 33 force feeds the discrete lengths of glass fiber into inlet port 54 of compounding extruder 35. Loss-in-weight scale 70 allows the weight of glass fibers being supplied to apparatus 30 to be determined. A similar loss-in-weight scale (not shown) may be provided to measure the amount of polymeric resins and additives that are supplied to feed hopper 32. Auger 33 (not shown) is preferably operated to minimize the breakage of glass fibers to substantially maintain their original lengths.

Within compounding extruder 35, the molten polymeric resins, additives, and glass fibers are mixed and compounded to form a substantially homogeneous mass. Rotating screw 52 (FIG. 4) mixes and compounds the ingredients and forces them toward die 62. Supplemental heater 55 may also be provided to ensure that the ingredients are sufficiently molten to flow into and through die 62. Motor 38 drives a power transmitting device 39 (e.g., a belt drive) which in turn rotates screw 52. Rotating screw 52 is preferably operated in a manner that minimizes glass fiber breakage to better ensure that the glass fibers maintain their original lengths.

Die 62 has an interior that is formed to provide a desired cross-sectional shape of preform 27. In one embodiment, die 62 has an interior that is formed to provide preforms 27 in the shape of pellets. As with FIG. 2, a cut-off saw (not shown) may be provided to cut the extruded preforms to the desired length. Unlike the apparatus of FIG. 2, the process and apparatus of FIGS. 3 and 4 generally provide preforms 27 with glass fibers oriented in a variety of directions, i.e., they are generally anisotropic. As result, the glass fibers may also overlap and become entangled with one another, providing even greater reinforcing ability.

In addition to the processes and apparatuses depicted in FIGS. 2-4, a process known as PUSHTRUSION™ (Plasti-Comp, LLC) may be used to provide glass-reinforced, epoxy-based structural reinforcing member preforms of the type described herein. As with the process of FIGS. 3-4, PUSHTRUSION™ involves pushing glass fibers into a molten composition. Exemplary PUSHTRUSION™ processes and apparatuses are described in Hawley, U.S. Pat. No. 6,186,769 ("Hawley"), the entire contents of which are hereby incorporated by reference. As shown in FIG. 1 of Hawley, in one exemplary embodiment, coated glass fibers may be cut with blade 96 and then discharged into an in-line extruder and injection molding machine 64. However, the coated glass fibers may also be cut into preforms and stored for subsequent processing in a separate injection molding machine or other forming device.

In order to better ensure that the desired length of glass fibers is maintained in the preforms and injection molded product, processes which coat continuous strands of glass fibers are preferred to those in which pre-cut, discrete lengths of glass fibers are coated. Thus, while the process of FIGS. 3 and 4 may be used to provide glass fiber reinforced, epoxy-based structural reinforcing compositions, continuous coating processes such as pultrusion and PUSHTRUSION™ are preferred.

The structural reinforcing compositions described herein are well suited for molding into expandable, structural reinforcing members that can be used to seal cavities and other hollow areas of a vehicle and provide structural reinforcement to the vehicle. As mentioned previously, in certain illustrative methods a glass fiber-reinforced, epoxy-based preform 27 in the shape of a pellet is prepared. The pellets are then injection molded into a desired shape at a temperature of from about 80° C. to about 95° C. using known injection molding techniques and equipment. Those skilled in the art will appreciate that the desired shape of the molded composition will depend upon the volume of the cavity to be sealed and baffled, as well as the configuration of that cavity, thus ensuring that the composition fully expands into a sealing relationship of the sidewalls. The molding process is preferably carried out such that no curing occurs. In an especially preferred embodiment, once the sealing member is installed in a vehicle, it is then subjected to temperatures sufficient to cause curing based on the nature of the epoxy resin(s) and curing agent(s).

The glass-fiber reinforced structural reinforcing members may be formed as free-standing parts, or they may be supported on a support structure. One preferred support structure is an open lattice. Referring to FIGS. 5-8, sealant and baffle apparatus 70 is shown. The apparatus 70 broadly includes three expandable, U-shaped members 72, 74, 76 (see FIGS. 5 and 6) and a support 78 (see FIGS. 6 and 7).

Figure 5:
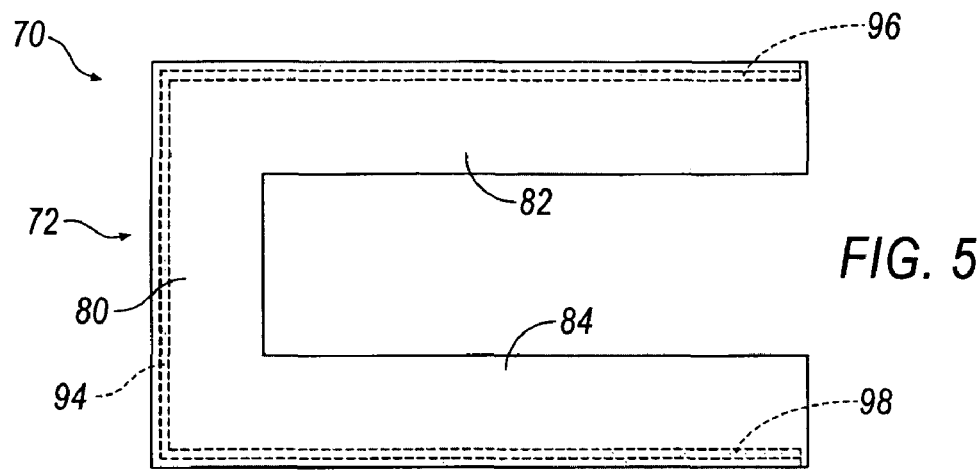
FIG. 5 depicts a side elevation view of a sealant and baffle apparatus comprising an epoxy-based structural reinforcing composition.
Figure 6:
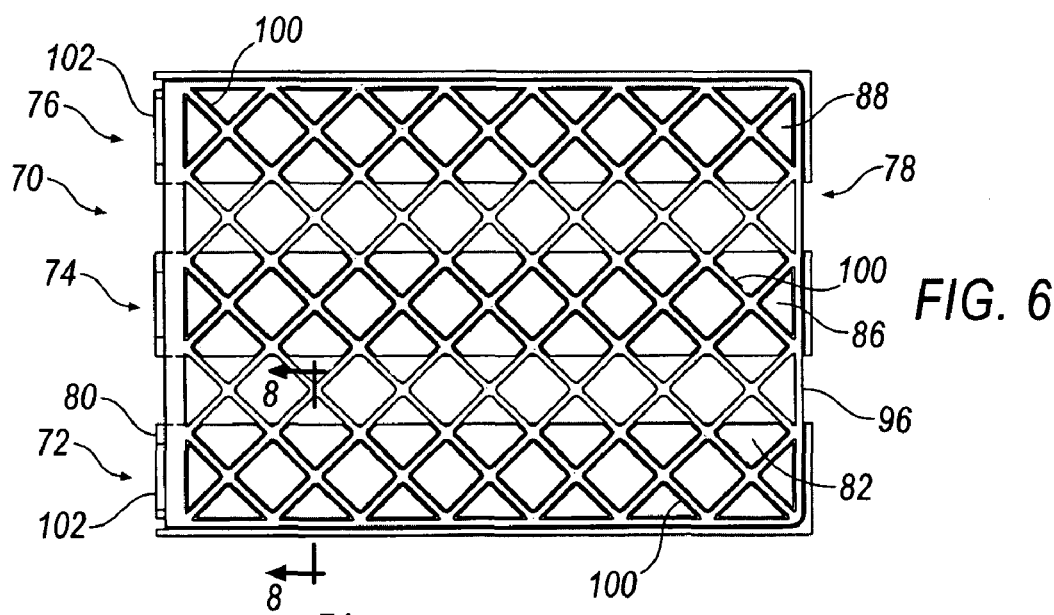
FIG. 6 is a top plan view of the apparatus of FIG. 5.
Figure 7:
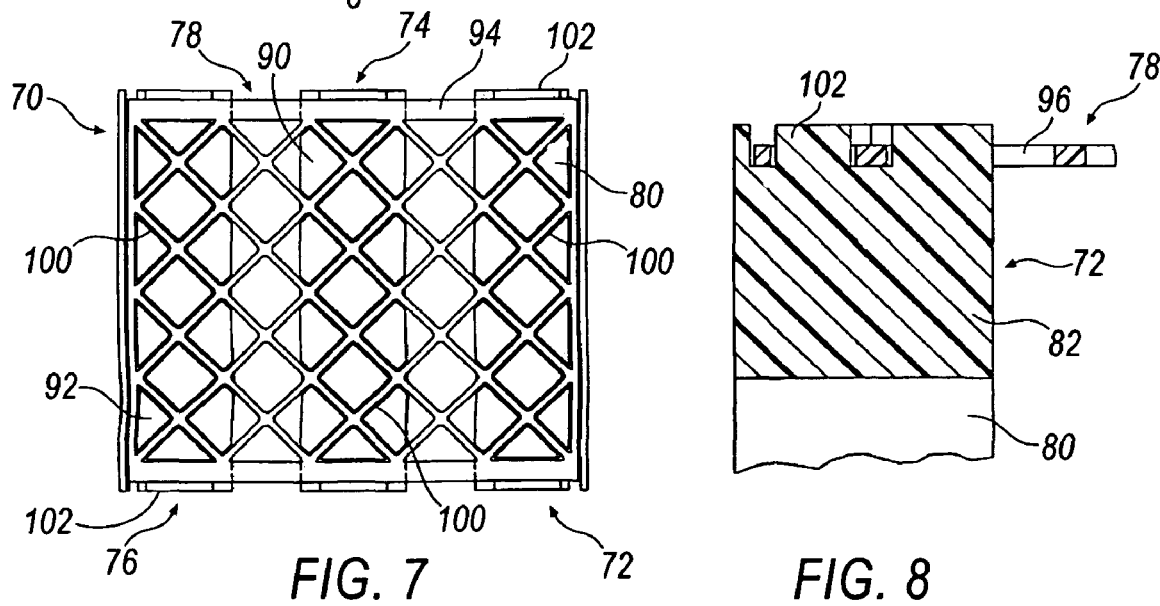
FIG. 7 is a left-end elevation view of the apparatus of FIG. 5.
Figure 8:
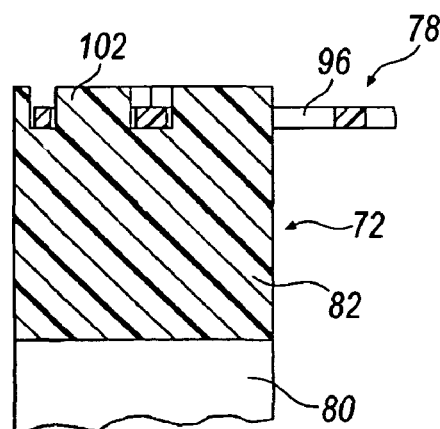
FIG. 8 is a fragmentary sectional view taken along line 8-8 of FIG. 6.

Referring to FIG. 5, member 72 includes a base portion 80 and two leg portions 82, 84. Members 74, 76 are identical to member 72 in that they each include a base portion and two leg portions. Leg portions 86, 88 of members 74, 76, respectively, are illustrated in FIG. 6, while base portions 90, 92 of members 74, 76, respectively, are illustrated in FIG. 7. In each of members 72, 74, 76, the leg portions are substantially perpendicular to their respective base portions. Stated otherwise, each of the legs of members 72, 74, 76 is substantially parallel to its counterpart leg on the respective member. Members 72, 74, 76 are each formed of the structural reinforcing compositions described above, which are preferably supplied as preforms (e.g., pellets) that are injection molded to form integral members having the illustrated U-shape.

Support 78 is formed of three sections, i.e., a base section and two leg sections, which are likewise configured into a U-shape. Base section 94 of support 78 is illustrated in FIG. 7 while leg section 96 is illustrated in FIG. 6. The final leg section 98 of support 78 is shown in phantom in FIG. 5. Each of sections 94, 96, 98 of support 78 have a latticework structure and are formed of a material having a melting point higher than the temperature at which members 72, 74, 76 expand. A preferred material for support 78 is nylon, and particularly glass reinforced nylon.

The outside planar surfaces of the base and leg portions of members 72, 74, 76 are preferably formed with depressions (indicated by double lines 100 in FIGS. 6 and 7). These depressions correspond in both size and shape with the size and shape of the latticework of support 78. The depressions are preferably at least as deep as the lattice is thick, and act as a retaining mechanism so that support 78 remains attached to members 72, 74, 76. Thus, the expandable structural reinforcing composition of which members 72, 74, 76 are formed protrudes somewhat through the lattice openings of support 78 (as indicated by numeral 102 in FIGS. 6-8). Support 78 can be formed so that each of the sections 94, 96, 98 are integral, or alternately, each of sections 94, 96, 98 can be formed separately and connected by some fastening mechanism (such as clips or snaps) around the members 72, 74, 76 of the apparatus.

In operation, the apparatus 70 is positioned within the channel of a hollow member (such as within a vehicle). The apparatus 70 can be positioned at any angle and orientation as determined appropriate by one having ordinary skill in the art. For example, the base portions 80, 90, 92 and base section 94 of apparatus 70 can be positioned against the lower wall of the channel, while the respective leg portions and sections of apparatus 70 would be positioned against the sidewalls of the channel. Or, the apparatus 70 could be inverted so that the base portions 80, 90, 92 and base section 94 are positioned against the upper wall of the channel.

Once the apparatus 70 is positioned within the channel, the apparatus 70 is then subjected to heat (such as by passing the vehicle through a bake oven). In an exemplary embodiment, the apparatus is subjected to a temperature of at least about 300° F. (149° C.). The heat application will cause the composition to expand in all directions, thus protruding even further through the openings of the latticework. The expanded composition will then adhere to the walls of the channel, securing apparatus 10 within the channel.

When the structural reinforcing compositions described herein are subjected to temperature of at least about 120° C., the percent expansion will preferably be at least about 80% and more preferably, at least about 120%. In an especially preferred embodiment, the percent expansion will be at least about 150%. As used herein, the term "percent expansion" is defined as follows:

Percent expansion=100×{[(specific gravity of composition before heating)−(specific gravity of composition after heating)]/(specific gravity of composition after heating)}

The expanded structural reinforcing compositions will preferably have a density of no greater than 0.60 g/cm³. Upon curing, they will also preferably have a peak compressive stress of at least about 15 MPa. A peak compressive stress of at least about 20 MPa is more preferred. In certain exemplary embodiments, the expanded structural reinforcing compositions will also have a compression modulus of from about 1100 MPa to about 1900 MPa.

In certain illustrative epoxy-based structural reinforcing compositions of the type described herein, increasing the length of reinforcing glass fibers may result in improved ductility. As discussed below, it has been observed that by increasing glass fiber length, the length of observed crack propagation under impact testing is reduced, which is indicative of improved ductility.

While the figures illustrate an embodiment utilizing a support structure for the compositions of the invention, those skilled in the art will understand that the structural reinforcing compositions described herein do not require a support structure and can be used in a freestanding, self-sustaining form. Also, numerous other supports can be used with the compositions of the invention depending upon the particular application.

EXAMPLES

The following examples set forth illustrative structural reinforcing compositions that are reinforced with glass fibers. The compositions and methods are exemplary only and should not be construed as limiting the scope of the claims appended hereto.

Two formulations were compounded and coated on continuous strands of glass roving using a pultrusion process. Compounding was performed at a rate of about 50 lbs/hour with a laboratory scale single screw operating at approximately 120 rpm. Strands of Star Stran® 706C E-glass fiber having a diameter of about 16 μm were pulled through a molten mixture of the compounded components (resins and additives) at an average rate of about 15 ft/minute. The coated fibers were then pulled through a strand pelletizer die and chopped to a desired length. Formulation A was chopped to provide pellet lengths of 6 mm, 8 mm, and 12 mm. Formulation B was chopped to provide pellet lengths of 6 mm and 12 mm. For comparison purposes, a control formulation was also prepared. However, glass fibers were not coated with the control formulation using a pultrusion process. Instead, 3 mm glass fibers were compounded with the other control formulation ingredients in a Brabender torque rheometer with sigma mixing blades.

TABLE 1

| Component | Control (weight %) | Formulation A (weight %) | Formulation B (weight %) |
|---|---|---|---|
| Solid epoxy resin | 61.25 | 61.25 | 70.21 |
| Aramid Fiber | 0.85 | 0.85 | 0.97 |
| Glass fiber | 17.72 | 17.72 | 20.31 |
| Glass microbubbles | 12.76 | 12.76 | 20.31 |
| Curing agent | 4.96 | 4.96 | 5.69 |
| Blowing agent | 2.46 | 2.46 | 2.82 |
| TOTAL | 100.00 | 100.00 | 100.00 |

In preparing Formulation A, a portion of the solid epoxy resin was pre-mixed with the glass microbubbles before being compounded with the remaining ingredients. In all three formulations, a portion of the epoxy resin was pre-mixed with the aramid fibers prior to compounding with the remaining ingredients.

During the pultrusion process used to form pellets from Formulations A and B, the ingredients were mixed and heated to a melt temperature of about 205° F. (96° C.). The continuous glass fiber strands were then pulled through the molten composition and heated to a temperature of about 245° F. (118° C.) in the pelletizing die. The coated fibers were then cooled and chopped to the lengths described above.

Using the control and A and B formulations, samples of 65 mm×10 mm×6 mm were prepared by injection molding test plaques from the pellets prepared via the pultrusion process. The molded test plaques were then baked at three different bake times and temperatures: 10 minutes at 165° C.; 25 minutes at 175° C.; and 15 minutes at 195° C. The baked samples were then subjected to dynamic mechanical analysis using a 3-point bend, multi-frequency strain controlled test protocol at a 15 Hz frequency and a 15 μm amplitude. In general, the DMA storage moduli showed that fiber length can be increased to obtain significant enhancements in storage modulus. The DMA Results are presented in Tables 2 and 3:

TABLE 2

−30° C. DMA Storage Modulus Results (MPa)

| Bake Condition | Control | A (6 mm) | A (8 mm) | A (12 mm) | B (6 mm) | B (12 mm) |
|---|---|---|---|---|---|---|
| 165° C. 10 min | 1825 | 2195 | 1907 | 2038 | 1498 | 1808 |
| 177° C. 25 min | 1447 | 2027 | 2030 | 2182 | 1584 | 1902 |
| 195° C. 15 min | 1565 | 2509 | 2159 | 2394 | 1543 | 1751 |

TABLE 3

80° C. DMA Storage Modulus Results (MPa)

| Bake Condition | Control | A (6 mm) | A (8 mm) | A (12 mm) | B (6 mm) | B (12 mm) |
|---|---|---|---|---|---|---|
| 165° C. 10 min | 1415 | 1715 | 1554 | 1741 | 1119 | 1408 |
| 177° C. 25 min | 1164 | 1574 | 1554 | 1730 | 1215 | 1460 |
| 195° C. 15 min | 1334 | 2064 | 1746 | 1899 | 1214 | 1351 |

As Tables 2 and 3 indicate, Formulation A showed improved storage moduli over the control formulation at all fiber lengths at each bake condition. At a 12 mm fiber length, Formulation B also showed improved storage moduli over the control formulation at two of the bake conditions, even though it did not include glass microbubble reinforcement.

Sample cylinders of 10 mm diameter and 30 mm length were also prepared by pressing the control formulation and formulations A and B into thin films, rolling them into cylinders, and baking them in a cylinder-shaped form treated with release paper. The sample cylinders were baked at three different bake times and temperatures: 165° C. for 10 minutes; 175° C. for 25 minutes; and 195° C. The baked cylinders were subjected to compression peak stress and compression modulus testing using ASTM C39 Standard tests and a compression rate of 30 mm/minute. The samples were tested at room temperature (20° C.), 80° C., and using post-cataplasma (PC) testing (72 hrs./70° C./100% humidity) at room temperature (20° C.) and 80° C. The compression modulus data are presented in Table 4 and the compression peak stress data are presented in Table 5:

TABLE 4

Compression Modulus (MPa)

| Test Condition | Control | A (6 mm) | A (8 mm) | A (12 mm) | B (6 mm) | B (12 mm) |
|---|---|---|---|---|---|---|
| 20° C. | 1067 | 1752 | 1900 | 1885 | 1394 | 1602 |
| 20° C. PC | 665 | 1367 | 1112 | 1404 | 1350 | 1322 |
| 80° C. | 863 | 1781 | 1634 | 1641 | 1396 | 1359 |
| 80° C. PC | 291 | 1357 | 1327 | 1548 | 1335 | 1604 |

As Table 4 indicates, both pultruded samples A and B showed significantly higher compression moduli at all glass fiber lengths as compared to the control sample.

TABLE 5

Compression Peak Stress (MPa)

| Test Condition | Control | A (6 mm) | A (8 mm) | A (12 mm) | B (6 mm) | B (12 mm) |
|---|---|---|---|---|---|---|
| 20° C. | 34 | 34 | 35 | 38 | 30 | 35 |
| 20° C. PC | 19.3 | 25 | 22 | 27 | 29 | 31 |
| 80° C. | 24 | 28 | 30 | 30 | 26 | 33 |
| 80° C. PC | 9.3 | 24 | 23 | 29 | 25 | 31 |

As Table 5 indicates, with the exception of Formulation A at a 6 mm glass fiber length, both pultruded formulations showed higher peak stresses than the control formulation at all fiber lengths. In addition, the peak stress generally trended upward with increasing glass fiber length.

The pultruded formulations were also injection molded into test plaques and impact tested. The molded plaques were 6 in.×6 in.×3 mm. The tested formulations were Formulation A with glass fiber lengths of 6, 8, and 12 mm and Formulation B with 6 and 12 mm. They were tested by dropping a 1 lb steel ball from a height of two feet onto the plaque and observing any resulting crack formation and propagation at room temperature. The 6 mm and 8 mm samples for Formulation A split in half. However, for both the A and B formulations, plaques prepared from the 12 mm glass fiber formulations yielded the least amount of crack propagation upon impact. Thus, glass fiber length can be used to improve the ductility of the epoxy-based structural reinforcing composition.

The pultruded formulations also showed good expansion upon baking. To determine the percent expansion, specific gravities were determined for the control formulation and Formulations A and B at various bake conditions. The percent expansion was then calculated according to the formula provided above based on the specific gravities at the various bake conditions and the specific gravity prior to baking. The three bake conditions were as follows: 10 minutes at 165° C.; 10 minutes at 165° C. followed by 25 minutes at 175° C.; and 10 minutes at 165° C. followed by 25 minutes at 175° C. and 15 minutes at 195° C. The percent expansion values for the various formulations are provided in Table 6:

TABLE 6

Percent Expansion

| Bake Condition | Control | A (6 mm) | A (8 mm) | A (12 mm) | B (6 mm) | B (12 mm) |
|---|---|---|---|---|---|---|
| 165° C. 10 min | 73 | 126 | 133 | 122 | 137 | 157 |
| 177° C. 25 min | 87 | 153 | 168 | 142 | 161 | 195 |
| 195° C. 15 min | 95 | 179 | 171 | 158 | 179 | 222 |

As the data in Table 6 indicate, the pultruded formulations yielded significantly higher percent expansion values as compared to the control formulation. In addition, the pultruded samples exhibited densities that were consistently below 0.6 g/cm$^3$ as shown by the specific gravity data in Table 7. Thus, while glass fiber filled materials are typically difficult to expand, the compositions and processes described herein unexpectedly provide excellent expansion.

TABLE 7

Specific Gravity

| Bake Condition | Control | A (6 mm) | A (8 mm) | A (12 mm) | B (6 mm) | B (12 mm) |
|---|---|---|---|---|---|---|
| 165° C. 10 min | .584 | .51 | .50 | .53 | .53 | .49 |
| 177° C. 25 min | .541 | .45 | .44 | .47 | .48 | .42 |
| 195° C. 15 min | .517 | .41 | .42 | .44 | .44 | .38 |

As the foregoing data indicates, the use of the processes and formulations described herein to provide an epoxy-based, glass fiber reinforced structural reinforcing composition provides added strength and ductility while still providing significant expansion for sealing applications. As a result, parts made from the glass fiber reinforced compositions described herein exhibit better handling stability and less cracking.

Preferred embodiments have been disclosed. A person of ordinary skill in the art would realize, however, that certain modifications would come within the teachings of this Invention, and the following claims should be studied to determine the true scope and content of the invention. In addition, the methods and structures of representative embodiments can be incorporated in the form of a variety of embodiments, only a few of which are described herein. It will be apparent to the artisan that other embodiments exist that does not depart from the spirit of the invention. Thus, the described embodiments are illustrative and should not be construed as restrictive.

The invention claimed is:

1. An expandable structural reinforcing material, comprising pellets of coated glass reinforcing fibers, formed by coating glass reinforcing fibers with a molten mixture;
    wherein the molten mixture comprises:
        at least one epoxy resin component, wherein each epoxy resin component is a solid at room temperature;
        at least one of a catalyst and a curing agent; and
        a blowing agent; and
    wherein the pellets are sized such that the pellets and the glass reinforcing fibers within the pellets have the same length of from 6 mm to 12 mm.

2. The expandable structural reinforcing material of claim 1, wherein the molten mixture comprises a curing agent.

3. The expandable structural reinforcing material of claim 2, wherein the curing agent cures the at least one epoxy resin at a temperature no lower than about 110° C.

4. The expandable structural reinforcing material of claim 1, wherein the molten mixture further comprises a nitrile butadiene rubber compatibilizer.

5. The expandable structural reinforcing material of claim 1, wherein the pellets are sized such that the glass reinforcing fibers within the pellets have an aspect ratio of at least about 100.

6. The expandable structural reinforcing material of claim 1, wherein the glass reinforcing fibers are present in an amount ranging from about 3% to about 40% by weight of the expandable structural reinforcing material.

7. The expandable structural reinforcing material of claim 6, wherein the glass reinforcing fibers are present in an amount ranging from about 10% to about 30% by weight of the expandable structural reinforcing material.

8. The expandable structural reinforcing material of claim 1, wherein the molten mixture further comprises a thermoplastic resin.

9. The expandable structural reinforcing material of claim 8, wherein the thermoplastic resin comprises polystyrene.

10. The expandable structural reinforcing material of claim 1, wherein the at least one epoxy resin component has a softening point of from about 70° C. to about 100° C.

11. The expandable structural reinforcing material of claim 1,
    wherein the molten mixture comprises a curing agent; and
    wherein the molten mixture further comprises aramid fibers and glass microbubbles.

* * * * *